United States Patent
Versluys et al.

(10) Patent No.: US 10,722,943 B2
(45) Date of Patent: Jul. 28, 2020

(54) ADDITIVE MANUFACTURING METHOD

(71) Applicant: Hamilton Sundstrand Corporation, Charlotte, NC (US)

(72) Inventors: Kiley James Versluys, Hartford, CT (US); Diana Giulietti, Tariffville, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 878 days.

(21) Appl. No.: 14/993,701

(22) Filed: Jan. 12, 2016

(65) Prior Publication Data
US 2017/0197249 A1   Jul. 13, 2017

(51) Int. Cl.
| | |
|---|---|
| B22F 3/00 | (2006.01) |
| B22F 3/105 | (2006.01) |
| B33Y 10/00 | (2015.01) |
| B33Y 30/00 | (2015.01) |
| B33Y 50/02 | (2015.01) |
| B29C 64/393 | (2017.01) |
| B29C 64/153 | (2017.01) |

(52) U.S. Cl.
CPC ............ *B22F 3/1055* (2013.01); *B22F 3/003* (2013.01); *B29C 64/153* (2017.08); *B29C 64/393* (2017.08); *B33Y 10/00* (2014.12); *B33Y 30/00* (2014.12); *B33Y 50/02* (2014.12); *B22F 2003/1057* (2013.01); *B22F 2999/00* (2013.01); *Y02P 10/295* (2015.11)

(58) Field of Classification Search
None
See application file for complete search history.

(56) References Cited

U.S. PATENT DOCUMENTS

| | | |
|---|---|---|
| 2010/0233012 A1 | 9/2010 | Higashi et al. |
| 2012/0133080 A1 | 5/2012 | Moussa et al. |
| 2013/0312928 A1 | 11/2013 | Mercelis |
| 2015/0174827 A1 | 6/2015 | Schwarze et al. |
| 2015/0224607 A1 | 8/2015 | Bruck |

FOREIGN PATENT DOCUMENTS

| | | |
|---|---|---|
| CN | 104084584 A | 10/2014 |
| CN | 105903961 A | 8/2016 |
| WO | 2015078595 | 11/2013 |
| WO | 2015079200 A2 | 11/2013 |
| WO | 2016156020 A1 | 10/2016 |

OTHER PUBLICATIONS

Search Report regarding related GB App. No. GB1700451.6; dated Jul. 13, 2017; 4 pgs.

*Primary Examiner* — Colin W. Slifka
(74) *Attorney, Agent, or Firm* — Cantor Colburn LLP

(57) ABSTRACT

A method of making an article is disclosed involving determining a plurality of patterns of discrete sections for a plurality of layers of fusible material. According to the method, the patterns are determined having section boundaries that avoid alignment with section boundaries of other layer patterns among the plurality of patterns according to criteria specified for the article. Layers of fusible material are repeatedly fused with an energy beam applied in a scanning pattern to each of the discrete sections sequentially for each of the plurality of patterns in the plurality of layers.

10 Claims, 2 Drawing Sheets

ADDITIVE MANUFACTURING METHOD

BACKGROUND

The described subject matter relates generally to the field of additive manufacturing. In particular, the subject matter relates to operating an energy beam to facilitate additive manufacturing.

Additive manufacturing refers to a category of manufacturing methods characterized by the fact that the finished part is created by layer-wise construction of a plurality of thin sheets of material. Additive manufacturing may involve applying liquid or powder material to a workstage, then doing some combination of sintering, curing, melting, and/or cutting to create a layer. The process is repeated up to several thousand times to construct the desired finished component or article.

Various types of additive manufacturing are known. Examples include stereo lithography (additively manufacturing objects from layers of a cured photosensitive liquid), electron beam melting (using a powder as feedstock and selectively melting the powder using an electron beam), laser additive manufacturing (using a powder as a feedstock and selectively melting the powder using a laser), and laser object manufacturing (applying thin solid sheets of material over a workstage and using a laser to cut away unwanted portions).

Many additive manufacturing processes utilize a scanning energy beam to fuse a fusible material. Scanning is commonly implemented in a raster scanning mode where a plurality of substantially parallel scan lines are used to form the article. In order to reduce deformation of the layers from thermal or chemical reaction kinetics effects, each layer is often scanned in discrete sections at separate locations along the layer. Seams are thus formed at boundaries between adjacent sections. It is known to avoid direct stacking of seams between adjacent layers by providing some variation in section patterning between adjacent layers. However, such variation in section patterning has been practiced utilizing pre-set repeating variation patterns without regard to the specifics of the article being manufactured. Although such pre-set repeating patterns can reduce direct vertical seam stacking can still occurs through repetition of section patterning throughout the various layers of the manufactured article.

BRIEF DESCRIPTION

According to some embodiments of the disclosure, a method of making an article comprises determining a plurality of patterns of discrete sections for a plurality of layers of fusible material. According to the method, the patterns are determined having section boundaries that avoid alignment with section boundaries of other layer patterns among the plurality of patterns according to criteria specified for the article. Layers of fusible material are repeatedly fused with an energy beam applied in a scanning pattern to each of the discrete sections sequentially for each of the plurality of patterns in the plurality of layers.

According to some embodiments of the disclosure, an additive manufacturing apparatus comprises a build location for a fusible material, an energy beam scanning emitter, and a controller in communication with the energy beam scanning emitter. The controller is configured to determine a plurality of patterns of discrete sections for a plurality of layers of fusible material. The patterns are determined having section boundaries that avoid alignment with section boundaries of other layer patterns among the plurality of patterns according to criteria specified for the article. The controller is further configured to repeatedly fuse layers of fusible material with the energy beam applied in a scanning pattern to each of the discrete sections sequentially for each of the plurality of patterns in the plurality of layers.

BRIEF DESCRIPTION OF THE DRAWINGS

Subject matter of this disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Figure 1:
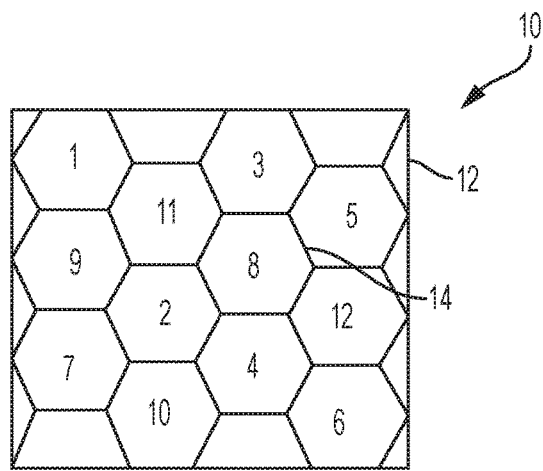
FIG. 1 is a schematic depiction of an example embodiment of pattern of scanning sections for a layer in an additive manufacturing process.

With reference to the figures, FIG. 1. is a schematic depiction of a typical example of a section pattern 10 for an additive manufacturing process. As shown in FIG. 1, a portion 12 of a layer for additive manufacturing fabrication is divided into a plurality of hexagonal sections divided by section boundaries 14. The particular shapes (i.e., hexagonal) of the individual sections is of course merely illustrative, and many other shapes can be utilized as well. Examples of section shapes include shapes for both regular tessellated geometric patterns (e.g., hexagons, squares, triangles, large octagons combined with small squares), and irregular patterns with either linear or non-linear section boundaries. The whole sections in FIG. 1 (i.e., those not cut off by the arbitrary border of the depicted portion 12) are numbered 1 through 11. These numbers represent an example of an embodiment of an order in which the sections are subjected to scanning (e.g., raster scanning) by an energy beam for fusion of fusible material. In some embodiments, a physical separation between ordered sections in the scanning sequence as shown in FIG. 1 can promote resistance to deformation from thermal or densification effects encountered in melting or sintering processes, or reaction kinetic effects encountered in stereolithographic processes. Of course, the orientation and number of depicted sections in FIG. 1 is schematic and conceptual in nature. In actual practice, a layer of an article being manufactured could be divided into many more sections than those illustrated for convenience in FIG. 1, with larger physical separations (in terms of number of intervening sections) between sequentially ordered sections in the scanning process.

As disclosed above, a plurality of patterns of scanning sections is determined according to criteria specified for the article being manufactured. This determination can be carried out in a number of different ways using various types of algorithms. In some embodiments, an iterative process can be used. In some embodiments, an iterative process comprises beginning with a first pattern of sections, and repeatedly utilizing a predetermined variation of that pattern and each adjacent subsequent pattern combined to determine a prospective adjacent subsequent pattern, checking each subsequent pattern for vertically aligned or overlapping section boundaries with previous section boundaries, and adjusting each prospective pattern to avoid vertically aligned or overlapping section boundaries according to criteria specified for the manufactured article (as used herein, "avoid" can mean to reduce, minimize, or eliminate). The above layer-by-adjacent layer iterative process can be performed in real time during the manufacturing process between the formation of each layer in the article structure, or can be performed in a batch microprocessor sequence prior to commencement of the fabrication process. In some embodiments, an iterative process can be performed in an order other subsequent adjacent layers. For example, in a pre-fabrication microprocessor sequence, section patterns for seam-sensitive portions of the article can be determined first, followed by determination of patterns for other layers. Identification of seam-sensitive portions of the article can be performed by a microprocessor according to predetermined criteria (e.g., thickness of the article or portion thereof (e.g., wall portion) or localized composition of article sub-components) or by operator identification during input of the article parameters. In some embodiments, a process other than an iterative process can be used to determine section patterns. For example, each layer can be patterned with a set of boundaries following a protocol that uses a microprocessor-based randomized vector generator to generate a random walk pathway throughout the layer that forms the section boundaries and that is programmed to avoid alignment or overlap with specified other section boundaries among the section patterns of the other layers.

As disclosed above, the patterns are determined so as to avoid section boundaries according to criteria specified for the article being manufactured. Various criteria can be specified, depending on the specific details of the article being manufactured. Examples of some criteria include but are not limited to the criteria discussed below. In some embodiments, criteria can include thickness of the article (including thickness of an article feature such as a wall structure) in a region of sections being evaluated for boundary alignment. In some embodiments, a thinner article or article feature is more sensitive to the effects of seam alignment or overlap, and increase the likelihood of triggering a flag for an alignment/overlap to be avoided or trigger a more aggressive modification to a pattern or prospective pattern. In some embodiments, criteria can include geometry of the article in a region of sections being evaluated for boundary alignment or overlap. In some embodiments, certain gometrical features like angular structures can increase the likelihood of triggering a flag for an alignment/overlap to be avoided or trigger a more aggressive modification to a pattern or prospective pattern. In some embodiments, criteria can include mechanical properties of bulk fused material in a region of sections being evaluated for boundary alignment or overlap. In some embodiments, criteria can include mechanical property specifications for the article in a region of sections being evaluated for boundary alignment or overlap. In some embodiments, criteria can include proximity to a surface of the article or article feature of sections being evaluated for boundary alignment. In some embodiments, closer proximity to a surface of the article or article feature of sections being evaluated for boundary alignment can increase the likelihood of triggering a flag for an alignment/overlap to be avoided or trigger a more aggressive modification to a pattern or prospective pattern. In some embodiments, criteria can include mechanical property specifications for the article in a region of sections being evaluated for boundary alignment or overlap. In some embodiments, criteria can include number of intervening layers of fused material between sections being evaluated for boundary alignment. In some embodiments, a smaller number of intervening layers of fused material between sections being evaluated for boundary alignment can increase the likelihood of triggering a flag for an alignment/overlap to be avoided or trigger a more aggressive modification to a pattern or prospective pattern. In some embodiments, criteria can include operator identification of region of sections for avoidance of boundary alignment. Any of the above criteria or other criteria can be used individually or in combination. The criteria can be evaluated against predetermined limits on specified parameters stored in a controller or set by an operator, or can be evaluated using logic routines (e.g., each of one or more criteria can generate a point value representing a risk factor from seam alignment/overlap and pattern modification can be triggered when a total point count limit is exceeded.

Figure 2:
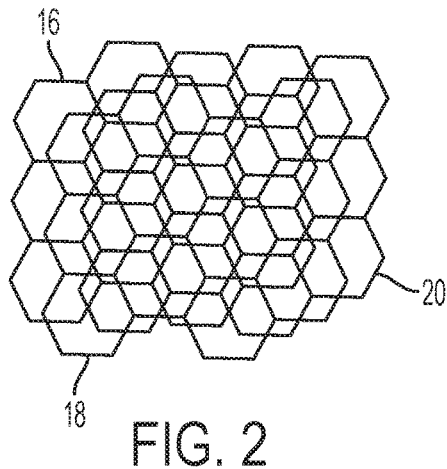
FIG. 2 is a schematic depiction of an example embodiment of a pattern variation for scanning sections of different layers in an additive manufacturing process.
Figure 3:
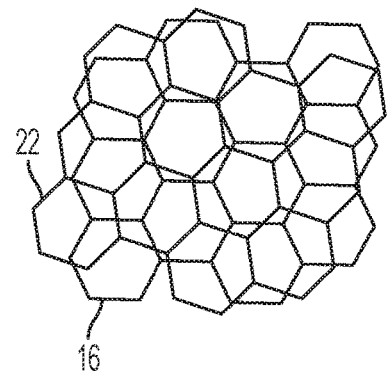
FIG. 3 is a schematic depiction of another example embodiment of a pattern variation for scanning sections of different layers in an additive manufacturing process.
Figure 4:
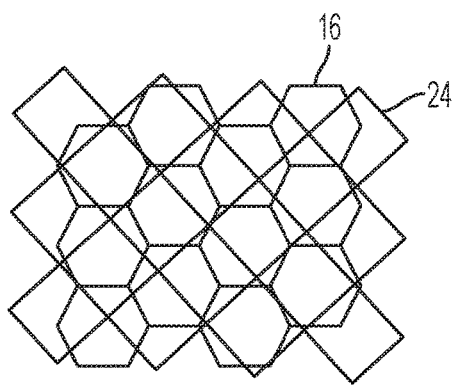
FIG. 4 is a schematic depiction of another example embodiment of a pattern variation for scanning sections of different layers in an additive manufacturing process.
Figure 5:
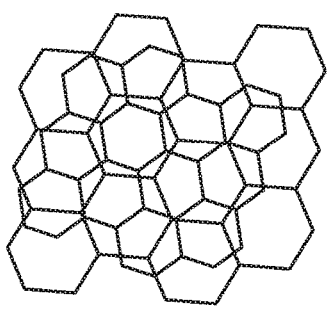
FIG. 5 is a schematic depiction of another example embodiment of a pattern variation for scanning sections of different layers in an additive manufacturing process.
Figure 6:
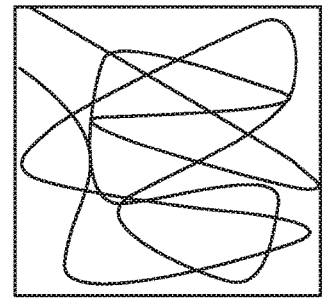
FIG. 6 is a schematic depiction of another example embodiment of a pattern variation for scanning sections of different layers in an additive manufacturing process.

Known approaches to scanning section pattern modification have been quite limited, e.g., reversing a pattern as a mirror image and re-centering along a single axis in the x-y plane. Such approaches can be used herein as well, but with a proactive approach based on criteria that are specified for the article being manufactured. Other new approaches, some of which can offer controllable degrees of effectiveness or variation in modifying scanning section patterns, can also be used. Examples of embodiments of pattern modification approaches are depicted in FIGS. 2-6. FIG. 2 depicts an approach where section patterns 16, 18, and 20 are differentiated from one another by shifting or displacement on multiple axes in the x-y plane, with pattern 20 shifted from pattern 16 along the x-axis and from pattern 18 on an axis at 45° between the x-axis and the y-axis, and pattern 16 shifted from pattern 18 on a different −45° between the x-axis and the y-axis. FIG. 3 depicts an approach where section pattern 22 is rotated on a z-axis with respect to pattern 16. Other layer patterns could be rotated on the same z-axis by different angular amounts or could be rotated on different axes in the z-plane. FIG. 4 depicts an approach where section pattern 24 has different section shapes with respect to pattern 16. FIG. 5 depicts an approach where section pattern 26 has different size sections with respect to pattern 16. FIG. 6 depicts an approach having randomized section boundaries, with boundary lines defined by where section boundaries are defined by a microprocessor based randomized vector generator to generate a 'random walk' (i.e., a macro-sized analog to a random walk configuration known in the polymer molecule field) pathway through the layer to be fabricated. Other layers can be configured with other randomized boundary configurations that are virtually unlimited in number to produce a zero or near-zero boundary alignment/overlap configuration among the layers of the article to be manufactured.

Various types of additive manufacturing materials, energy sources, and processes can be used according to the disclosure. The type of additive manufacturing process used depends in part on the type of material out of which it is desired to manufacture an article. In some embodiments, the article is made of metal, and a metal-forming additive manufacturing process can be used. Such processes can include selective laser sintering (SLS) or direct metal laser sintering (DMLS), in which a layer of metal or metal alloy powder is applied to the workpiece being fabricated and selectively sintered according to the digital model with heat energy from a directed laser beam. Another type of metal-forming process includes selective laser melting (SLM) or electron beam melting (EBM), in which heat energy provided by a directed laser or electron beam is used to selectively melt (instead of sinter) the metal powder so that it fuses as it cools and solidifies. In some embodiments, the article is made of a polymer, and a polymer or plastic forming additive manufacturing process can be used. Such process can include stereolithography (SLA), in which fabrication occurs with the workpiece disposed in a liquid photopolymerizable composition, with a surface of the workpiece slightly below the surface. Light from a laser or other light beam is used to selectively photopolymerize a layer onto the workpiece, following which it is lowered further into the liquid composition by an amount corresponding to a layer thickness and the next layer is formed. It should be noted that SLA processed may require a second type of energy beam for vector scanning along the contour edge for liquefaction and re-solidification of the fused material, different than the energy beam used for photopolymerization. Polymer articles can also be fabricated using selective heat sintering (SHS), which works analogously for thermoplastic powders to SLS for metal powders. Another exemplary additive manufacturing process that can be used for polymers or metals is fused deposition modeling (FDM), in which a metal or thermoplastic feed material (e.g., in the form of a wire or filament) is heated and selectively dispensed onto the workpiece through an extrusion nozzle.

Figure 7:
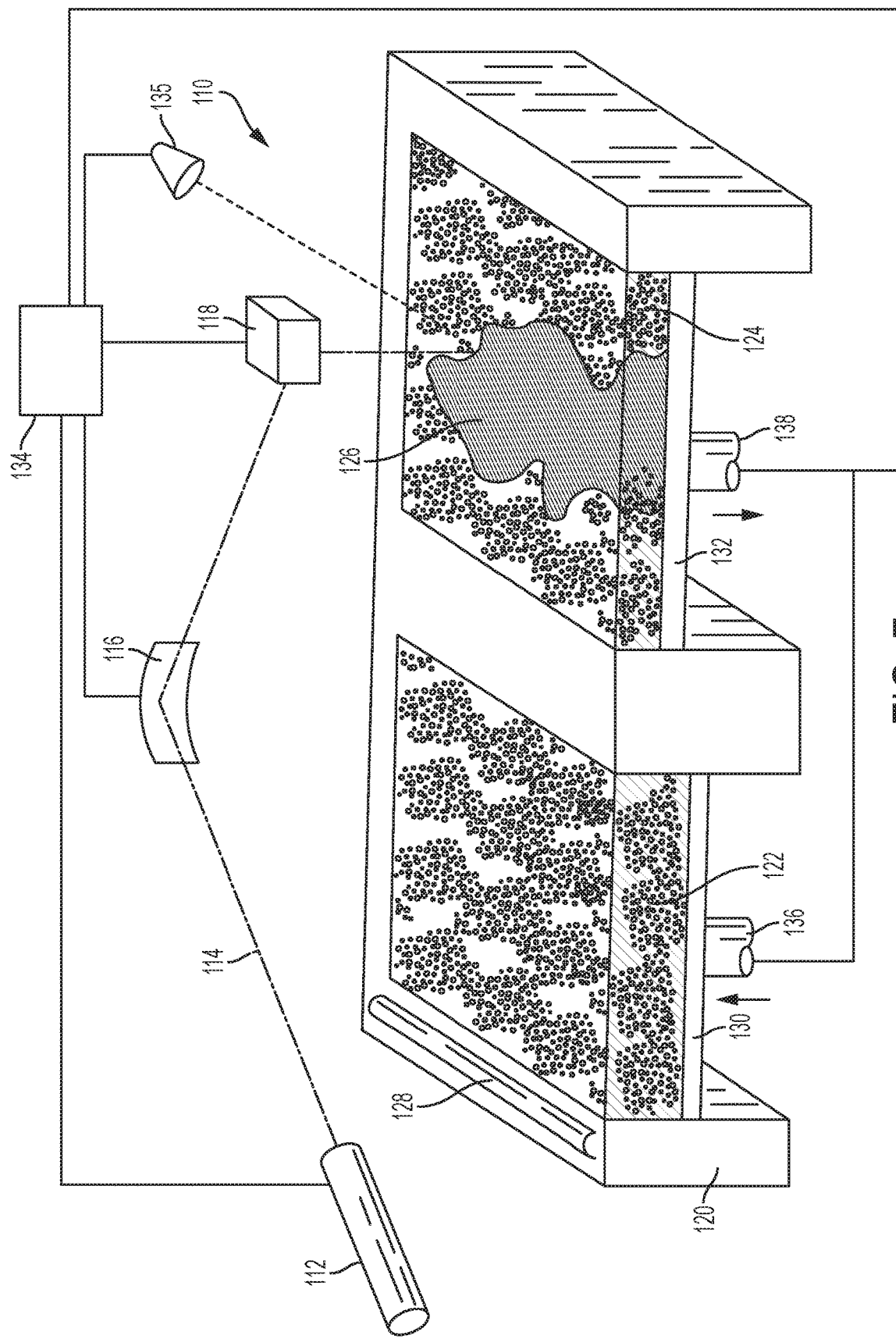
FIG. 7 is a schematic depiction of an example embodiment of an additive manufacturing apparatus.

Many additive manufacturing processes utilize a fusible powder such as a metal powder or a plastic powder. An example embodiment of an apparatus for powder fusion additive manufacturing is schematically depicted in FIG. 7. As shown in FIG. 7, an example of an additive manufacturing system or apparatus 110 includes energy source 112 that generates an energy beam 114, a first wave guide or other optical guide 116 that is used to guide the energy beam, a second wave guide or optical guide 118, a frame 120, a powder supply 122, a powder processing bed 124, sintered powder material 126, a spreader 128, a powder supply support 130, and a stack support 132. A controller 134 is operatively connected to the energy source 112, optical guides 116, 118, spreader 128, optional sensor 135, and actuators 136 and 138 for powder supply support 130 and stack support 132, respectively. Of course, the illustration in FIG. 7 is schematic in nature, and many alternative designs of additive manufacturing devices are possible. Various types of additive manufacturing materials, energy sources, powder feed and storage, atmosphere control, and processes can be used to fabricate articles and the individual features thereof that are described herein.

Energy source 112 can be any source capable of creating focused energy. For example, energy source 112 can be a laser or an electron beam generator. Energy source 112 generates an energy beam 114, which is a beam of focused or focusable energy, such as a laser beam or an electron beam. Optical guide 116 such as a mirror is present in some embodiments to deflect radiation in a desired direction. A second optical guide 118, such as an optical head is present in some embodiments, and also directs energy in a desired direction. For example, optical guide 118 can include a mirror and be attached to an x-y positioning device. Frame 120 is used to contain powder material in powder supply 122 and in powder processing bed 124. Powder supply 122 and powder processing bed 124 include powder material, such as or powdered metals. Powder processing bed 124 further includes fused powder 126. Fused powder 126 is powder contained within powder processing bed 124 that has been at least partially sintered or melted. Spreader 128 is a spreading device such as an air knife using an inert gas instead of air, which can transfer powder material from powder supply 122 to powder processing bed 124. The depiction of spreader 128 in FIG. 7 is of course only schematic in nature, and does not depict specific features such as controllably directed air jet nozzles that could be used to remove metal powder from targeted portions of the assembly such as fluid flow passages in the heat exchanger core, without removing metal powder from the first region between the heat exchanger core and the housing. Powder supply support 130 and stack support 132 are used to raise and/or lower material thereon during additive manufacturing.

During operation, energy source 112 generates energy beam 114, which is directed by the optical guides 116 and 118 to the powder processing bed 124. The energy intensity and scanning rate and pattern of the energy beam 114 can be controlled to produce a desired result in the powder processing bed. Optional sensor 135 can measure parameters at the build location for use in closed loop control by the controller 134. In some aspects, the result can be partial melting of powder particles resulting in a fused structure after solidification such as a sintered powder metal structure having some degree of porosity derived from the gap spaces between fused powder particles. In some aspects, the result from exposure to the energy beam 14 can be complete localized melting and fluidization of the powder particles producing a metal article having a density approaching or equal to that of a cast metal or plastic article. In some aspects, the energy beam provides homogeneous melting such that an examination of the manufactured articles can detect no particle pattern from the original particles. After each layer of the additively manufactured article is completed, powder supply support 130 is moved by actuator 136 to raise the height of powder material supply 122 with respect to frame. Similarly, stack support 132 is moved by actuator 138 to lower the height of article with respect to frame 120. Spreader 28 transfers a layer of powder from powder supply 122 to powder processing bed 124. By repeating the process several times, an object may be constructed layer by layer.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

The invention claimed is:

1. A method of making an article, comprising:
   determining an energy beam scanning pattern including a plurality of energy beam scanning patterns of discrete scanning sections for a plurality of layers of fusible material, the patterns including seam boundaries at boundaries between sections, including non-aligned seam boundaries of different layers among the plurality of patterns;
   identifying a plurality of seam-sensitive portions of the article according to criteria selected from the group consisting of:
      thickness of the article in a region of sections being evaluated for boundary alignment,
      geometry of the article in a region of sections being evaluated for boundary alignment,
      mechanical properties of bulk fused material in a region of sections being evaluated for boundary alignment,
      mechanical property specifications for the article in a region of sections being evaluated for boundary alignment,
      proximity to a surface of the article of sections being evaluated for boundary alignment,
      number of intervening layers of fused material between sections being evaluated for boundary alignment,
      operator identification of region of sections for avoidance of boundary alignment, and combinations thereof;
   adjusting section boundary positions among the plurality of energy beam scanning patterns in said seam-sensitive portions of the article to reduce, minimize, or eliminate overlaps of section boundary of different layers, thereby forming an adjusted plurality of energy beam scanning patterns of sections;
   fusing a first layer of the plurality of layers by fusing a fusible material with an energy beam applied discretely to each section according to a first energy beam scanning pattern of sections to form the first layer including seams at the seam boundaries between scanning sections in the first layer; and
   repeatedly fusing successive layers of fusible material with an energy beam applied discretely to each section according to the adjusted plurality of energy beam scanning patterns of sections to form the seams at the seam boundaries between scanning sections in each successive layer of the plurality of layers.

2. The method of claim 1, comprising determining a first pattern of sections in a first layer, and repeatedly utilizing a predetermined variation of that pattern in an adjacent layer to determine a prospective adjacent subsequent pattern, checking each subsequent pattern for vertically aligned or overlapping section boundaries with previous section boundaries in said seam-sensitive portions, and adjusting each prospective pattern to avoid vertically aligned or overlapping section boundaries according to said criteria.

3. The method of claim 1, wherein the criteria comprise thickness of the article in a region of sections being evaluated for boundary alignment.

4. The method of claim 1, wherein the criteria comprise mechanical properties of bulk fused material in a region of sections being evaluated for boundary alignment.

5. The method of claim 1, wherein the criteria comprise mechanical property specifications for the article in a region of sections being evaluated for boundary alignment.

6. The method of claim 1, wherein the criteria comprise proximity to a surface of the article of sections being evaluated for boundary alignment.

7. The method of claim 1, wherein the criteria comprise number of intervening layers of fused material between sections being evaluated for boundary alignment.

8. The method of claim 1, wherein the criteria comprise operator identification of region of sections for avoidance of boundary alignment.

9. The method of claim 1, wherein patterns of sections of different layers are varied by:
   shifting patterns of sections on a plurality of x-y plane axes;
   rotating patterns of sections about one or more z axes;
   varying shapes of sections between patterns;
   varying sizes of sections between patterns;
   randomized section boundaries between patterns,
   or combinations thereof.

10. The method of claim 1, wherein the criteria comprise geometry of the article in a region of sections being evaluated for boundary alignment.

* * * * *